Patented Oct. 2, 1934  1,975,423

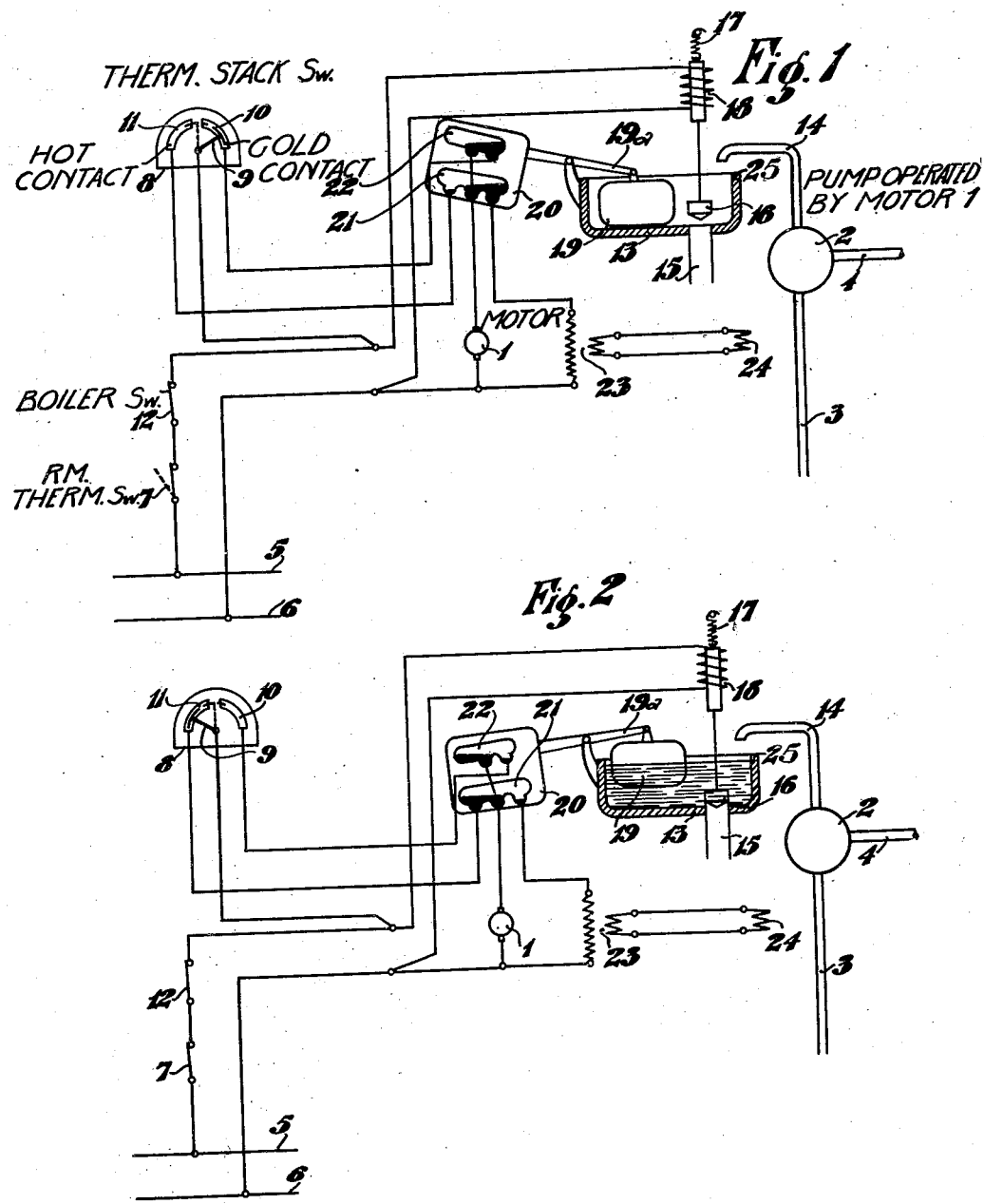

UNITED STATES PATENT OFFICE 1,975,423

AUTOMATICALLY CONTROLLED OIL BURNING SYSTEM

Alfred Hilken, Geneva, Switzerland, assignor to firm: Ateliers H. Cuenod, S. A., Geneva, Switzerland Application November 13, 1931, Serial No. 574,909 In Switzerland October 9, 1931

1 Claim. (Cl. 158—28)

This invention relates to an automatically controlled oil burning system of the type of those comprising an electric motor which actuates a pump sending the oil to the burner and which is placed under the dependency of two thermostats of which the one puts the motor out of action or in action according to a given temperature of the room to be heated being attained or not, while the second, cooperating with a commutator, permits to start the motor and to stop it at the end of a predetermined period if the oil does not burn.

Usually in installations of this type, the contacts of the commutator are controlled by a rotatable member which turns under the influence of a horological mechanism and which during its rotation acts on the contacts at given moments. One has also realized devices provided with electromagnets having a dashpot and cooperating with bimetallic blades capable of being heated; the more or less retarded movement of these blades is used to actuate the contacts in the desired moment.

But all this apparatus is complicated and of a delicate nature which increases the cost of the installation and renders its operation less sure. The present invention has for its object to remove these inconveniences and consists in the provision of an electric control mechanism for oil burners in which a suitable switch member, cooperating with a thermal stack switch sensitive to combustion conditions for controlling the motor circuit, is connected to a float mechanism, capable upon movement of the float caused by fuel accumulation due to operation of the fuel pump, of actuating said switch member.

The accompanying drawing represents by way of example and diagrammatically one embodiment of the present invention.

Fig. 1 is a diagrammatic view of the installation, at the moment of the starting of the motor.

Fig. 2 is a similar view, at normal operation.

An electric motor 1 actuates a pump 2; this latter draws oil from a reservoir, not shown, by the tube 3, to send it to the burner by the tube 4. The electric supply mains 5 and 6 furnish current for operating the motor 1. A switch 7 is controlled by a regulating thermostat placed in the room to be heated, and a thermal switch 8 is controlled by a thermostat disposed in the stack or at another point of the course of the hot combustion gases and its mobile part 9 stays in contact with the contact piece 10 as long as the oil does not burn, to come into contact with the contact piece 11 when the oil burns and has sufficiently heated the stack. A switch 12 is controlled by a thermostat placed in the boiler and destined to prevent overheating of this latter.

The receptacle 13 is fed with oil, at the same time as the burner, by the pump 2, owing to the pipe 14; this receptacle is provided with an emptying orifice 15 normally closed by a valve 16 which a spring 17 tends to maintain raised and which an electro-magnet 18 applies to its seating; the winding of this electromagnet is branched to the mains 5 and 6 in series with the switches 7 and 12. A floating bulb 19 is connected to one end of a lever 19a mounted rotatably on the receptacle 13 and of which the other end carries a switch member 20.

This latter which cooperates with the thermal stack switch 8, is constituted by a three-pole mercury tube 21 and a two-pole mercury tube 22, and of which the one, the tube 22, is destined to connect one of the terminals of the motor 1 to the contact piece 10 of the switch 8, while the other 21, is destined to connect the same terminal to the contact piece 11 of the said switch. The mobile contact 9 of this latter is branched in series with the boiler switch 12 and room thermal switch 7 to the conductor 5 while the second terminal of the motor 1 is connected directly to the conductor 6.

23 is a transformer of which the primary is put in shunt with the motor 1, and can be put in circuit by the mercury tube 21, while the secondary serves to bring to incandescence an ignition spiral 24 placed in the burner in proximity to oil discharge orifices. The Fig. 1 shows the mechanism at the moment of starting operation of the burner. The switches 7 and 12 are closed and the current, starting from the conductor 6, flows to the motor, to the two contacts of the mercury tube 22, to the contact piece 10 and the mobile arm 9 of the switch 8 and to the two switches 7 and 12 to come back to the conductor 5; the primary of the transformer 23 is put in circuit by the mercury tube 21. It results therefrom that the pump 2 starts to turn and sends oil to the burner which is ignited while coming in contact with the spiral 24. On the other hand, the switches 7 and 12 being closed, the electromagnet 18 applies the valve 16 on its seat; the oil which the pump sends into the receptacle raises therefore slowly the floating bulb; at a given moment, the float as it rises rocks the mercury tubes which take the position shown in Fig. 2.

During this time the heat developed by the combustion has acted on the thermostat controlling the switch 8 of which the switch arm 9 comes to the contact piece 11. The motor 1 is from now on connected, by means of the mercury tube 21, the contact piece 11 and the mobile arm 9 of the switch 8, to the switches 7 and 12 and the conductor 5 of the mains; the transformer 23 has been put out of circuit owing to the movement of the mercury tube 21. When the oil sent to the burner is not ignited, the switch 8 does not enter into action and its arm 9 will stay on the contact 10 after the switch member 20 has been brought into the position shown in Fig. 2; the motor 1 will then be put out of circuit and the oil will cease to be sent to the burner. It will be seen from the drawing that almost immediately after the float 19 commences to rise the mercury will flow in the tube 21 so as to contact with the left hand pole and it is only when the float reaches the position shown in Fig. 2 that the mercury ceases to have contact with the right hand pole of the tubes 21, 22. The two contacts 10, 11 and switch arm 9 are so formed that the switch arm 9 touches the contact 11 before it entirely leaves the contact 10, a suitable interval being thus afforded for effecting ignition of the fuel, and interruption of the motor circuit is avoided while the switch arm 9 changes its position. The receptacle 13 will be provided with a suitable overflow 25 to maintain a constant oil level during normal operation of the burner.

When the desired temperature is attained in the room to be heated, the room thermal switch 7 will be actuated and will cut the circuit of the motor and of the electromagnet 18; the valve will be raised by the spring 17 and the receptacle 13 will empty, whereby the floating bulb and the switch member 20 are brought back into the position of Fig. 1. The same result would be obtained when the boiler switch would open, which would occur if the boiler became overheated.

I claim:

In combination, an electrically actuating fuel feeding means, an ignition means, a temperature controlled stack switch having a first contact which is closed in the absence of combustion and a second contact which is closed in the presence of combustion prior to the opening of the first contact, a main control switch, and a timing switch mechanism operable to simultaneously open first contacts and close second contacts a time period after the initiation of fuel feed, a starting circuit including the main switch, the first contact of the stack switch, the first contacts of the timing switch mechanism in series with the fuel feeding and ignition means connected in parallel and a running circuit including the main switch, the second contact of the stack switch, the second contacts of the timing switch mechanism, and the fuel feeding means in series.

ALFRED HILKEN.